UNITED STATES PATENT OFFICE.

BYRON B. GOLDSMITH, OF NEW YORK, N. Y.

THERMOPLASTIC COMPOUND OF PROTEIDS AND AMINS.

No. 922,133.      Specification of Letters Patent.      Patented May 18, 1909.

Application filed October 7, 1907. Serial No. 396,192.

*To all whom it may concern:*

Be it known that I, BYRON B. GOLDSMITH, a citizen of the United States, residing in the borough of Manhattan, city, county, and State of New York, have invented a certain new and useful Improvement in Thermoplastic Compounds of Proteids and Amins, of which the following is a specification.

This invention has relation to treatment of albuminoids or proteids with amido compounds or amins, whereby a thermoplastic composition of matter is produced.

In my U. S. Patent Number 840,931, dated January 8th, 1907, I have described a process whereby a thermoplastic compound may be made from casein or its derivatives, as a convenient and cheap substitute for celluloid, rubber and the like; and I made it clear in said patent that the term "thermoplastic" was meant to describe those masses which, while reasonably hard at ordinary temperatures, are rendered soft by heat, so as to permit the uniting of separate masses, and the molding of any mass to any desired shape.

My present invention is based upon the discovery that the results obtained by the general method described in said patent may be obtained by treatment of any of the animal or vegetable albuminoids or proteids, their derivatives and compounds, with any of that class of substances known as amins or amido compounds. These compounds, in other words, act as "converting agents" in the sense of those words as used in my said patent.

Among the albuminoid bodies which unite with the amins to form a thermoplastic mass may be mentioned the proteids of blood and egg, the gelatoids (such as collagen, isinglass etc.) casein, gluten and other vegetable albuminoids and keratin, as well as the combinations, derivatives and compounds of these substances. For the sake of brevity I have used the term "albuminoid" herein to cover these and other similar proteid substances.

Shortly stated, my invention involves the modification of the properties of "albuminoids" (using the word as above defined) by uniting them with amins or amido compounds, one or more at once, preferably under conditions of heat and pressure, for the production of a thermoplastic composition of matter, useful in the manufacture of molded articles of many kinds, and supplying a cheap and superior substitute for celluloid, rubber etc.

Among the converting agents of the general class claimed herein which I have found useful are naphthylamin, benzidin, anilin, toluidin, xylidin and diphenylamin. All of these not already liquid will melt on heating and my invention covers the use of all amins having this property. Those amins which on the contrary cannot be melted by heat, but generally decompose, are not suitable for my purpose and are not included in my claims. The mode of action of these converting agents is not perfectly clear. In some cases it is probably due to partial solution of the albuminoid when heated, but I do not confine myself to any theory of action; nor is it essential to my invention whether or not there is a chemical combination between the albuminoid and the amido compound.

In many cases the derivatives of proteids or their compounds, or combinations of two or more proteids, when united to the amins, give results superior to those derived from use of a single unchanged proteid. Moreover it is often unnecessary that a given proteid should be isolated or refined for the purposes of my process, but in many cases the material containing it can be used and my claims are intended to cover the use of such materials except where otherwise expressly stated.

In the manufacture of my present composition, the albuminoids undergo the same treatment as is described in my said patent in connection with the converting agents there named; that is to say they may be united with the amido compound on or between suitable heated rolls. Any other method may be used whereby these substances are brought into intimate contact. Instead of using the amins in their natural state, they may be first dissolved in alcohol, or other suitable liquid which is afterward driven off by heat. One practicable proportion is the following: Take a quantity of curd which would weigh four pounds if dry and sprinkle the same with one pound of any one of the amins above specifically enumerated, dissolved in alcohol. This is well mixed, preferably on suitably heated rolls, and, when the mixture is completed, the mass is removed and is soft while hot but hardens on cooling. Scraps of various substances may be mixed in with the masses thus formed in considerable quantities. Among these are celluloid scraps, finely divided albuminoids, bits of horn, rubber, resins, gums and coloring matter. Compounding substances or fillers can also be incorporated without departing from this invention.

What I claim is—

1. The process of making a thermoplastic composition of matter which consists in intimately mixing an albuminoid with an amido compound, substantially as described.

2. The process of making a thermoplastic composition of matter which consists in adding an amido compound to an albuminoid and then heating and pressing the combined ingredients, substantially as described.

3. The process of making a thermoplastic composition of matter which consists in adding an amido compound to an albuminoid and subjecting the combined ingredients to heat and pressure, substantially as described.

4. The process of making a thermoplastic composition of matter which consists in adding naphthylamin to an albuminoid and subjecting the combined ingredients to heat and pressure, substantially as described.

5. A thermoplastic composition of matter consisting of an albuminoid united to an amido compound, substantially as described.

6. A composition of matter consisting of an albuminoid united to an amido compound, substantially as described.

7. A composition of matter consisting of casein or its equivalent united to an amido compound, substantially as described.

8. A composition of matter consisting of an albuminoid united to naphthylamin, substantially as described.

9. A composition of matter consisting of casein or its equivalent united to naphthylamin, substantially as described.

BYRON B. GOLDSMITH.

Witnesses:
H. S. MacKaye,
M. A. Butler.